(12) United States Patent
Pierlot et al.

(10) Patent No.: US 8,255,539 B2
(45) Date of Patent: Aug. 28, 2012

(54) SYSTEM AND METHOD FOR EXTENDING SESSIONS

(75) Inventors: Loïc Pierlot, Carros (FR); Stephane Mollard, Grasse (FR); Bertrand Alberola, Mouana Sartoux (FR)

(73) Assignee: Amadeus SAS, Madrid (ES)

( * ) Notice: Subject to any disclaimer, the term of this patent is extended or adjusted under 35 U.S.C. 154(b) by 1276 days.

(21) Appl. No.: 11/647,271

(22) Filed: Dec. 29, 2006

(65) Prior Publication Data

US 2008/0159318 A1 Jul. 3, 2008

(51) Int. Cl.
*G06F 15/16* (2006.01)

(52) U.S. Cl. .................. 709/227; 709/228; 709/229

(58) Field of Classification Search ........... 709/227–229
See application file for complete search history.

(56) References Cited

U.S. PATENT DOCUMENTS

| | | | | |
|---|---|---|---|---|
| 6,678,791 | B1 * | 1/2004 | Jacobs et al. | 711/118 |
| 6,877,095 | B1 * | 4/2005 | Allen | 713/182 |
| 7,174,383 | B1 * | 2/2007 | Biswas et al. | 709/229 |
| 7,340,525 | B1 * | 3/2008 | Bhatia et al. | 709/229 |
| 7,366,787 | B2 * | 4/2008 | Salas et al. | 709/229 |
| 7,386,672 | B2 * | 6/2008 | Casazza | 711/129 |
| 8,145,768 | B1 * | 3/2012 | Hawthorne | 709/228 |
| 2004/0015585 | A1 * | 1/2004 | McBrearty et al. | 709/225 |
| 2004/0039827 | A1 * | 2/2004 | Thomas et al. | 709/228 |
| 2004/0122958 | A1 * | 6/2004 | Wardrop | 709/229 |
| 2004/0255143 | A1 * | 12/2004 | Wemyss et al. | 713/200 |
| 2005/0066037 | A1 * | 3/2005 | Song et al. | 709/227 |
| 2005/0132222 | A1 * | 6/2005 | Petrovic | 713/201 |
| 2006/0075110 | A1 * | 4/2006 | Seraphin | 709/227 |
| 2006/0248025 | A1 | 11/2006 | Walker | |
| 2006/0282897 | A1 * | 12/2006 | Sima et al. | 726/25 |
| 2007/0094503 | A1 * | 4/2007 | Ramakrishna | 713/172 |
| 2007/0169189 | A1 * | 7/2007 | Crespo et al. | 726/20 |
| 2007/0204044 | A1 * | 8/2007 | Rice et al. | 709/225 |
| 2008/0263636 | A1 * | 10/2008 | Gusler et al. | 726/4 |
| 2009/0044020 | A1 * | 2/2009 | Laidlaw et al. | 713/176 |
| 2009/0124394 | A1 * | 5/2009 | Swarna | 463/43 |

OTHER PUBLICATIONS

PCT Search Report.

* cited by examiner

*Primary Examiner* — Aaron Strange
*Assistant Examiner* — Brian P. Whipple
(74) *Attorney, Agent, or Firm* — Steptoe & Johnson LLP

(57) ABSTRACT

A system and method of managing computer sessions are provided. The preferred method opens a session (such as for access to a database) and creates a token that includes a session opening time and a measure of the session duration. If the token is used within a predefined time window before the end of the session, the session is extended by updating the token to reflect a new session duration. The time window and duration of a session extension may be adjusted according to usage patterns of the system. The session may be extended recursively. The token expires when the last of the session extensions expires.

32 Claims, 5 Drawing Sheets

STS: Session Time Stamp-When the session was created

STO: Session Time Out duration- The length of the session

ETD: Extra Time Duration-The amount of time that can be added to the session during the recycling time RCW: ReCycling Window-The length of time at the end of a session in which an extension may be granted.

| Example of a Token before recycling | | | | 410 |
|---|---|---|---|---|
| STS | STO | ETD | RCW | |
| $T_0$ | 8 | 2 | 1 | |

| Example of a Token after recycling | | | | 412 |
|---|---|---|---|---|
| STS | STO | ETD | RCW | |
| $T_0$ | 10 | 2 | 1 | |

Fig. 4

SYSTEM AND METHOD FOR EXTENDING SESSIONS

BACKGROUND OF THE INVENTION

1. Field of the Invention

The present invention is directed to a methodology for minimizing the frequency of access to a computer system resource, such as a database. More specifically, the present invention is directed to setting fixed access periods which are extendable under certain conditions.

2. Discussion of Background Information

Security gateway systems operate on a token system in which a token is issued to a user for authentication and access. In such systems, the underlying database needs to be consulted for every user transaction to update the information in the token. This constant interaction with the database places considerable burden on the system that limits performance and responsiveness in real time.

SUMMARY OF THE INVENTION

Embodiments of the present invention are directed to allowing a user to access a computer system resource relying on a security gateway with substantially less interaction with the database than other methods. Such embodiments are described in the context of a user-management system where a user has a pre-determined duration of a session (e.g., eight hours which could be the default duration of a working day). During the session, the user may access a database or other computer system resource. Under certain circumstances, the user is allowed to continue to access the computer system resource after the scheduled close of the session.

In a preferred embodiment, a security gateway authenticates a user and issues a token that defines a default session period during which the user may access a database. The token also defines a time period, referred to here as a "recycling window," which preferably occurs just before the close of the default session. (The term "recycling window" is used merely as a label and not to define the characteristics of the window.) If the user accesses the database during the recycling window, the security gateway extends the session by revising the token. The conditions for allowing an extension may be any of a variety of criteria. For example, if a session's default duration is eight hours, the security gateway may issue a token that defines the end time of the eight-hour session. The token may also define a recycling window as the last thirty minutes of the default session. If the user actively access the database during the time period of the recycling window, the gateway may, without an additional access to the database, revise the token to extend the session by one hour. The reduction in interactions with the database alleviates load on the database system, and improves database responsiveness and throughput.

Sessions may be extended recursively. For example, a first session extension may define a new session termination time (or other measure of a session period) and a new recycling window within the extension period. If a user accesses the database during the recycling window of the extension period, the session may be extended a second time. The second extension period may encompass yet another recycling period, and the session may be extended further if the user accesses the computer system resource during the second recycling window. The durations of extension periods and recycling periods may be adjusted according to the needs of system operations. For example, it may be desirable to shorten second and subsequent extension periods to prevent infinite sessions or to limit employee overtime.

According to an embodiment of the invention, a method of managing sessions is provided. The method includes opening a session, creating a token that includes a session opening time and a measure of the session duration, receiving the token within a first time before the measure of the session duration, adding, in response to the receiving, a second time to the measure of the session duration to define a new measure of the session duration, updating the token to reflect the new measure of the session duration as changed by the addition, and expiring the token after the new measure of the session duration.

The above embodiment may have variations. For example, the receiving, adding, and updating may be recursive, such that if the token is received within the first time before the new measure of the session duration, the new session time is extended. The first time may be the same or different during or between any recursions of the receiving, adding, and updating. The second time may be the same or different during or between any recursions of the receiving, adding, and updating.

A transaction associated with a token that is received before the expiring may be processed. A session start time, a session timeout time, and the first time in the token may be stored. The second time in the token may be stored. The second time may be less than or equal to half of a period of authorized use as defined by the session opening time and/or the measure of the session duration. The first time may be less than or equal to half of the second time. Or the first time may be less than or equal to half of the second time.

According to another embodiment, a method of managing sessions may comprise requesting to open a session, first receiving a token that includes a session opening time and a measure of the session duration, sending a transaction request and the token within a first time before the measure of the session duration, and second receiving, in response to the sending, an updated measure of the session duration associated with the token.

The above embodiment may have various features. For example, the sending and second receiving may be recursive, such that if the token is sent within the first time before updated measure of the session duration, the updated session time is again updated. The first time may be the same or different during or between any recursions of the sending and second receiving. The second time may be the same or different during or between any recursions of the sending and second receiving.

A transaction associated with a token that is sent during a period of authorized use defined by a session opening time and/or a measure of the session duration may be processed. A session start time, a session timeout time, and the first time may be stored in the token. The second time may be stored in the token.

The second time may be less than or equal to half of a period of authorized use as defined by a session opening time and/or a measure of the session duration. The first time may be less than or equal to half of the second time. Or the first time may be less than or equal to half of the second time.

According to another embodiment, a method of managing sessions may comprise opening a session, creating a token that includes a timestamp of when the session opened and a session timeout time, receiving the token within a window before an expiration of the session timeout time, adding, in response to the above use, an extra time duration to the token, updating the token to reflect the extra time duration, and expiring the token after the new measure of the session duration. The time periods may satisfy the following equations:

$$etd \leq \frac{sto}{2}$$

$$rcw \leq \frac{etd}{2} \leq \frac{sto}{4}$$

where "sto" is a period of authorized use defined by the timestamp and/or the session timeout time, "etd" is the extended time duration, and "rcw" is the period of the window.

The above embodiments may have various additional features. For example, a server may coordinate with a database in association with the opening, updating, and expiring. Such coordination may be limited to the same.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 4 shows non-limiting examples of token contents; and

DETAILED DESCRIPTION OF THE EXEMPLARY EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The below embodiments are described in connection with a "Security Gateway" system. Security Gateway is a client/server framework offering security features to TOPs products (and potentially more than TOPs if needed). Security Gateway is based on PC (a physical device) identification. However, the invention is not so limited, and the methodology may apply to any user management, database management, or other computer system.

Figure 1:
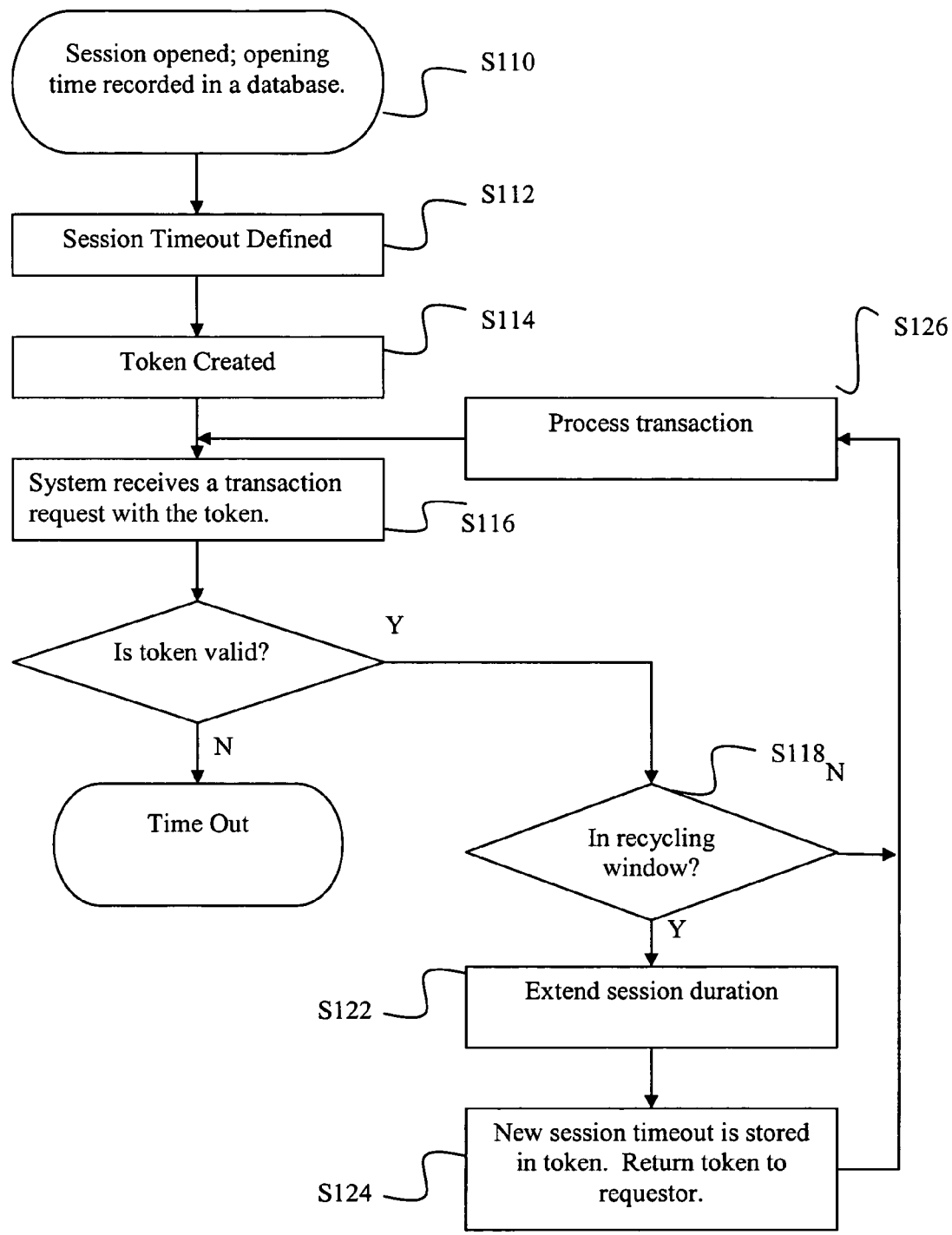
FIG. 1 is a flowchart illustrating the chronological steps of an embodiment of the invention.

Referring now to FIG. 1, a session is opened at S110 in response to receipt of a request by an authorized user, and the opening time is recorded in a database. At S112, a session timeout is defined, which preferably corresponds to the maximum duration of a session. The session timeout may be set as a time to elapse after the session opening (e.g., 8 hours after the session opens) or an absolute time (e.g., 5:00 PM EST). The time between the session opening and the session timeout establishes a period of authorized use.

At step S114, a token is created with an appropriate reference (such as a timestamp) identifying the time of the session opening and session timeout. Any further system transaction will preferably rely upon the token as opposed to the database. Absent some form of extension, the token will expire after the session timeout.

At step S116, the system receives a transaction request with an associated token. At step S118, the system determines whether the token is valid, e.g., whether the token indicates that the transaction is within the period of authorized use. If not, at step S120 the system returns a message that the session has timed out, and the corresponding transaction is rejected.

If at step S118 the token is valid, the system determines whether the transaction is within a predetermined time before the session timeout (otherwise known as a "recycling window"). If not, then the transaction is processed normally at step S126. If the transaction is within the recycle window, then the system coordinates with the database to extend the session timeout time at step S122 to include an extension of time to allow the session to remain open. At step S124, the new session timeout is stored in the token and the token is sent back to the requester. Control then passes to step S126 for processing the transaction.

In the above embodiment, the database was only accessed for two reasons: (1) opening the session and (2) a token was received within the recycling window. There was no need for the system to coordinate with the database for individual transactions. This represents a substantial reduction in database interaction with corresponding improvements in system performance.

Figure 2:
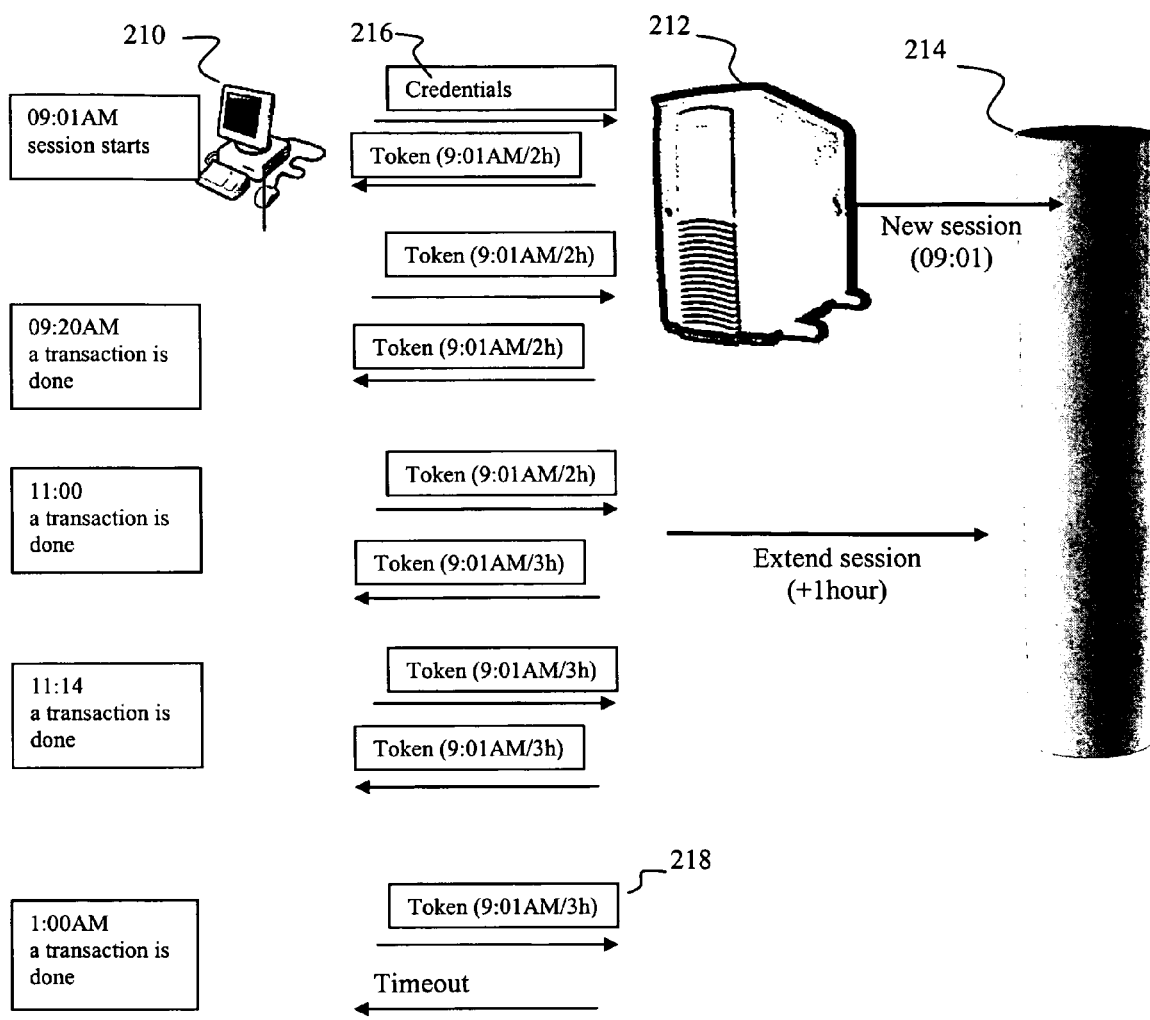
FIG. 2 is an embodiment of the above methodology shown at the architectural and signal exchange level.

Referring now to FIG. 2, an embodiment of the above methodology is shown at the architectural and signal exchange level. The system is shown in simplified form as a user PC 210, a server 212, and a database 214. The architecture is not so limited, however, as the system may have any number of centralized or dispersed terminals, servers, databases, or components that perform the disclosed functions.

A user requests to open a session by entering appropriate credentials at PC 210. PC 210 communicates this information 216 to server 212. Server 212 logs the new session in database 214, and sends a token 218 back to the user's PC 210. Token 218 includes a timestamp for the opening of the session and a session timeout. In the example of FIG. 2, the session is opened at 9:01 AM and the session timeout is 2 hours, such that token 218 will expire at 11:01 AM.

During the open session, user PC 210 initiates a transaction with server 212. The transaction includes token 218. Since token 218 is valid within the period of authorized use, server 212 will process the transaction as normal. Preferably, the transaction does not affect the status of token 218, although the token could be modified to reflect data relating to the transaction. The example in FIG. 2 shows this transaction occurring at 9:20 AM.

Later during the open session, the user PC 210 initiates a transaction with server 212 within the recycle window. Since token 218 is valid as within the period of authorized use, server 212 will process the transaction as normal. However, server 212 changes token 218 to extend the session timeout (e.g., by adding a specific time period (+1 hour)) or changing the underlying end of session time (e.g., 5:00 PM is changed to 6:00 PM). This token change may include an update of the original token, issuance of a new token, and/or destruction of the original token. The token change should take place at the server. Server 212 coordinates with database 214 as appropriate to update the new timeout for the token 218.

The period of authorized use extends by the amount of increase in the session timeout. The example of FIG. 2 shows this transaction occurring at 11:00 AM (one minute before the session timeout) and an extension of the session timeout from 2 hours to 3 hours. The user may continue to conduct additional transactions within the extended session period.

In the above embodiment, the database was only accessed for two reasons: (1) opening the new session and (2) token 218 was received within the recycling window. There was no need for server 212 to access and/or coordinate with database 214 for individual transactions. This represents a substantial reduction in database interaction with corresponding improvements in system performance.

This session extension methodology may be recursive. If a transaction is requested within the recycle window relative to the new session timeout, the system may provide another extension. Recycling windows, extension periods and circumstances supporting extensions may all be the same, respectively, such that the session may in theory be extended indefinitely. In the alternative, these parameters may change for subsequent transactions to make it more difficult to extend a session. By way of non-limiting example, the first recycle window may be 15 minutes, the next ten minutes, and thereinafter 5 minutes.

At some point the token will expire. A transaction requested after the session timeout will result in a "timeout" response, and the transaction will be denied. The example of FIG. 2 shows the timeout at 1:00 AM, which is one hour past the session timeout.

The token as described above is stateless, in that a newly created token is not stored in a server memory or database file other than the user's system. Rather, an algorithm verifies the token when the token is used in subsequent transactions. It can even be verified by a server which did not create the token itself. In such a stateless transaction, all the transactions are linked together by a token, but the servers do not need to keep a track of the created token.

Figure 3:
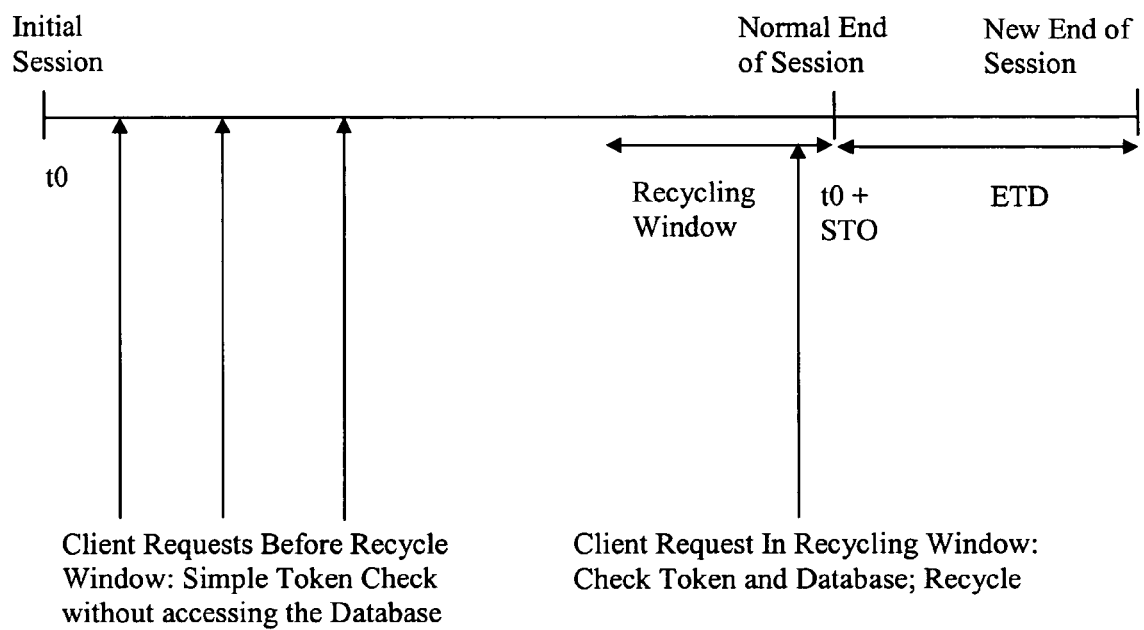
FIG. 3 is a timeline of sessions and token-use for the opening of the session, transactions within the period of authorized use before the recycling window, transactions within the authorized window, and the extension of the session timeout.

Referring now to FIG. 3, a timeline of sessions and token use is shown for the opening of the session, transactions within the period of authorized use before the recycling window, transactions within the authorized window, and the extension of the session timeout.

FIG. 4 shows non-limiting examples of token contents. Tokens are shown for a token 410 before recycling, and for a token 412 after recycling.

Figure 5:
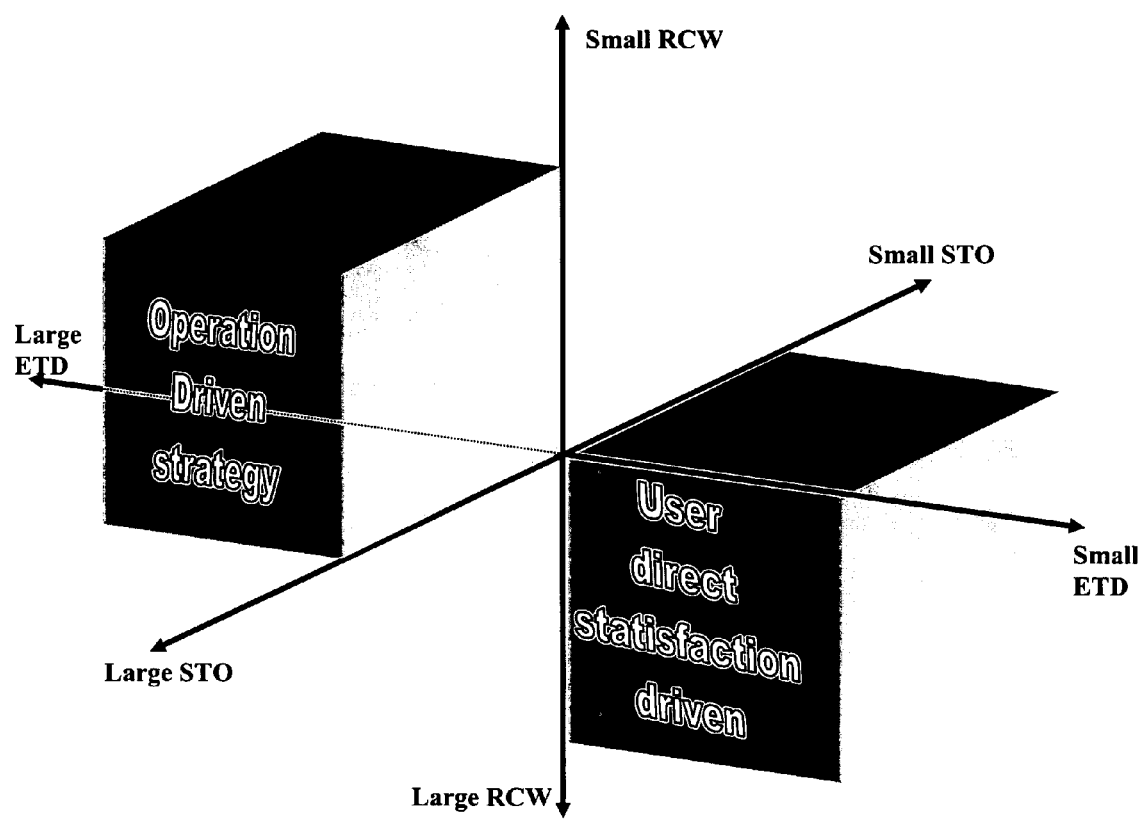
FIG. 5 shows an embodiment which provides a methodology for "tuning" the amount of time assessed to the session timeout, the recycle window, and the session extension.

Referring now to FIG. 5, another embodiment of the invention provides a methodology for "tuning" the amount of time assessed to the session timeout, the recycle window, and the session extension. A long timeout value will reduce the database access which will occur for recycling only after a long first period. A small timeout value avoids long locking issues on the client side in case of unused sessions but statically causes more frequent recycling. It is preferable to define a balance between a long default timeout value and a small one by compromising between the technical and operational side (stability by reducing the number of database accesses) and the client point of view (having as few constraints as possible by using the most flexible system).

The value of the recycling window and the length of the extension will also define the volume of database accesses. A long recycling window will statically extend more sessions than a small one and will therefore trigger more database accesses. The extended session timeout brings the same pros and cons as the default timeout value, e.g., a small Extra Time Duration avoids long locked sessions but statistically causes more frequent recursive recycling.

By way of non-limiting example, compliance with the following formulas achieves an acceptable compromise of the above considerations:

$$etd \leq \frac{sto}{2}$$

$$rcw \leq \frac{etd}{2} \leq \frac{sto}{4}$$

Where:
Sto is the period of authorized use;
Etd is the amount of time added to the sto at recycling time; and
Rcw is the period of the recycling window.

If the embodiment is utilizing a recursive methodology, the above formula may be applied only once and the same values used for each successive session, or the values may be recalculated for each recursion.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of managing sessions, comprising:
opening a session;
issuing a token from a security gateway that defines a session opening time, a recycling window start time and end time, and a measure of the session duration;
wherein:
(a) said recycling window occurs before the measure of session duration expires;
(b) after opening the session, the security gateway that issued the token does not coordinate with a database for user transactions before said recycling window start time; and
(c) the session remains open during the period between said opening time and said measure of session duration;
receiving the token within said recycling window start time and end time, and before said measure of the session duration; and
updating the token upon receiving the token within the recycling window start time and end time by adding a second time to the measure of session duration to define a new measure of session duration for the token;
wherein the security gateway does not coordinate with a database for user transactions between said opening and said updating, and the session remains open during the period between said opening and expiration of said new measure of session duration.

2. The method of claim 1 wherein the measure of the session duration is either a relative time period measured from the session opening time or an absolute time measured against a same time reference as the session opening time.

3. The method of claim 1, wherein said receiving, adding, and updating are recursive, such that if the token is received within the recycling window start time and end time before said new measure of session duration, said new measure of session duration is extended.

4. The method of claim 3, wherein the recycling window is the same during any recursions of said receiving, adding, and updating.

5. The method of claim 3, wherein the recycling window may be different between any recursions of said receiving, adding, and updating.

6. The method of claim 3, wherein the second time is the same during any recursions of said receiving, adding, and updating.

7. The method of claim 3, wherein the second time may be different between any recursions of said receiving, adding, and updating.

8. The method of claim 1, further comprising processing a transaction associated with a token that is received before said new measure of session duration expires.

9. The method of claim 1, further comprising storing in the token at least the session start time, the measure of the session duration, and the recycling window start time and end time.

10. The method of claim 9, further comprising storing in the token at least the second time.

11. The method of claim 1, wherein the second time is less than or equal to half of a period of authorized use, as defined by the session opening time and/or the measure of the session duration.

12. The method of claim 11, wherein the recycling window is less than or equal to half of the second time.

13. The method of claim 1, wherein the recycling window is less than or equal to half of the second time.

14. The method of claim 1, wherein:
in association with said opening, a server coordinates with a centralized database to store session data; and
in association with said updating, the server coordinates with the centralized database to store updated token data.

15. The method of claim 1, wherein said server does not coordinate with the database in response to user-server interactions other than (a) in association with said opening and (b) in association with said updating.

16. A method of managing sessions, comprising:
requesting opening of a session;
first receiving a token that includes a session opening time, a recycling window start time and end time, and a measure of the session duration;
sending a transaction request and the token within said recycling window start time and end time, and before said measure of the session duration; and
second receiving, in response to said sending, an updated measure of the session duration associated with the token;
wherein:
(a) the session remains open during the period between said opening and an expiration of the session upon reaching the updated measure of the session duration;
(b) a non-expired or expired status of the token controls whether the session is open or closed, respectively; and
(c) a server that issued the token does not coordinate with a database for user-server transactions between said opening and said updating.

17. The method of claim 16, wherein said sending and second receiving are recursive, such that if the token is sent within the recycling window start time and end time, and before the updated measure of the session duration, said updated measure of the session duration is again updated.

18. The method of claim 17, wherein the recycling window is the same during any recursions of the sending and second receiving.

19. The method of claim 17, wherein the recycling window may be different between any recursions of the sending and second receiving.

20. The method of claim 17, wherein the second time is the same during any recursions of the sending and second receiving.

21. The method of claim 17, wherein the second time may be different between any recursions of the sending and second receiving.

22. The method of claim 16, further comprising processing a transaction associated with a token that is sent during a period of authorized use defined by a session opening time and/or a measure of the session duration.

23. The method of claim 16, further comprising storing in the token at least the session start time, the measure of the session duration, and the recycling window start time and end time.

24. The method of claim 23, further comprising storing in the token at least the second time.

25. The method of claim 16, wherein the second time is less than or equal to half of a period of authorized use as defined by a session opening time and/or a measure of the session duration.

26. The method of claim 25, wherein the recycling window is less than or equal to half of the second time.

27. The method of claim 16, wherein the recycling window is less than or equal to half of the second time.

28. A method of managing sessions, comprising:
opening a session;
creating a token that includes a timestamp of when the session opened and a session timeout time;
receiving the token within a recycling window before an expiration of the session timeout time;
adding, in response to said receiving, an extended time duration to the token;
updating the token to reflect the extended time duration; and
wherein:
(a) the session remains open during the period between said opening and said extended time duration;
(b) a non-expired or expired status of the token controls whether the session is open or closed, respectively; and
(c) a server that issued the token does not coordinate with a database for user-server transactions between said opening and said updating.

29. The method of claim 28, wherein:

$$etd \leq \frac{sto}{2}$$

$$rcw \leq \frac{etd}{2} \leq \frac{sto}{4}$$

where:

sto is a period of authorized use defined by the timestamp and/or the session timeout time;

etd is the extended time duration; and rcw is the period of the recycling window.

30. The method of claim 29, wherein said server does not coordinate with the database in response to user-server interactions other than (a) in association with said opening and (b) in association with said updating.

31. The method of claim 28, wherein:

in association with said opening, a server coordinates with a centralized database to store session data; and in association with said updating, the server coordinates with the centralized database to store the updated token data.

32. The method of claim 29, wherein a server does not coordinate with a database for user-server transactions between said opening and said updating.

* * * * *